United States Patent [19]

Davis

[11] 4,450,934

[45] May 29, 1984

[54] TRACTOR MUFFLER STRUCTURE

[76] Inventor: Max L. Davis, R.R. 3, Minneapolis, Kans. 67467

[21] Appl. No.: 350,889

[22] Filed: Feb. 22, 1982

[51] Int. Cl.³ .............................................. F01N 1/00
[52] U.S. Cl. .................................. 181/228; 181/255; 181/264
[58] Field of Search ...................... 98/60, 79; 181/212, 181/228, 255, 264

[56] References Cited

U.S. PATENT DOCUMENTS

| | | | |
|---|---|---|---|
| 1,009,573 | 11/1911 | Redding et al. | 98/59 |
| 2,468,961 | 5/1949 | Curphy | 98/59 X |
| 3,662,669 | 5/1972 | Cullinane, Jr. | 98/60 |
| 4,296,832 | 10/1981 | Kicinski | 181/255 |

FOREIGN PATENT DOCUMENTS 892780  3/1962  United Kingdom ................ 181/212

*Primary Examiner*—Albert J. Makay
*Assistant Examiner*—Harold Joyce
*Attorney, Agent, or Firm*—Phillip A. Rein

[57] ABSTRACT

This invention relates to a tractor muffler structure that is mounted in an upright position and operates to keep moisture and foreign particles from entering the internal workings of a tractor cab engine. The tractor muffler structure includes (1) an inlet pipe member connectable to an exhaust pipe from an engine; (2) a basic housing assembly secured to the inlet pipe; (3) an outlet pipe member secured to the basic housing assembly to convey gases therefrom; and (4) a fluid control assembly mounted within the basic housing assembly and connected to the inlet pipe member and the outlet pipe member. The basic housing assembly resembles a canister having the inlet pipe member extended through a bottom wall and the outlet pipe member extended through a top wall. The bottom wall has a drainage hole therein to allow fluids to pass therethrough. The fluid control assembly includes an inlet control member secured to the inlet pipe member; an intermediate control member secured to the inlet control member; and an outlet control member connected between the intermediate control member and the outlet pipe member. The inlet control member has an exhaust inlet opening to direct gas laterally of a longitudinal axis thereof. Similarly, the outlet control member has an exhaust outlet opening to receive exhaust gases from laterally of a longitudinal axis thereof. The intermediate control member includes a deflector plate assembly secured to the inlet control member and the outlet control member operable to control the movement of gases and fluids through the basic housing assembly.

7 Claims, 5 Drawing Figures

TRACTOR MUFFLER STRUCTURE

PRIOR ART

A search of the prior art revealed the following U.S. patents: U.S. Pat. Nos. 2,468,961; 2,887,033; 2,887,032; and 2,983,216.

The Stade et al patent teaches one known solution to keep moisture out of an engine block by the use of a weighted exhaust rain cover.

The Curphy patent discloses a curved exhaust pipe to keep moisture from entering the engine cylinder.

Both of the Wachter, Jr. patents disclose curved closure attachments for exhaust pipes having drainage openings therein to allow fluid to drain therefrom and prevent same from entering the engine cylinder.

PREFERRED EMBODIMENT OF THE INVENTION

In one preferred embodiment of the invention, a tractor muffler structure is connected to an exhaust pipe member on a trailer cab structure. The tractor muffler structure includes (1) an inlet pipe member connected to the exhaust pipe member; (2) a basic housing assembly secured to an upper end of the inlet pipe member; (3) an outlet pipe member secured to an upper end of the basic housing assembly; and (4) a fluid control assembly mounted with the basic housing assembly. The inlet and outlet pipe members resemble conventional conduit structures to convey fluids into and out of the basic housing assembly. The basic housing assembly resembles a cannister structure having a cylindrical side wall enclosed by a top wall and a bottom wall. The bottom wall is provided with a drainage hole to allow water and the like to escape therefrom. The fluid control assembly includes (1) an inlet control member secured to the inlet pipe member and extended through a hole in the bottom wall; (2) an intermediate control member secured to the inlet control member; and (3) an outlet control member secured to the outlet pipe member and extended through a hole in the top wall. Each of the inlet control member and the outlet control member is provided with oppositely facing exhaust openings into the basic housing assembly. The intermediate control member includes a deflector plate assembly secured in an inclined manner across the adjacent ends of the inlet and outlet control members. The deflector plate assembly controls the movement of gases in the basic housing assembly and deflects the liquids falling into the outlet pipe member laterally of the inlet control member for subsequent movement out of the drainage hole. This keeps snow, rain, foreign particles, etc. from entering the engine compartment.

OBJECTS OF THE INVENTION

One object of this invention is to provide a tractor muffler structure that is sturdy in construction; readily attached to new or used exhaust pipe members; and maintenance free.

A further object of this invention is to provide a tractor muffler structure that controls movement of exhaust gases therethrough and causes drainage of liquids therefrom without the liquids entering the engine cylinders.

One other object of this invention is to provide a tractor muffler structure having a fluid control assembly mounted within a basic housing having inlet and outlet control members to direct gases against and around a deflector plate assembly to control direction and movement of fluids therein.

Various other objects, advantages, and features of the invention will become apparent to those skilled in the art from the following discussion, taken in conjunction with the accompanying drawings, in which:

FIGURES OF THE INVENTION

Figure 1:
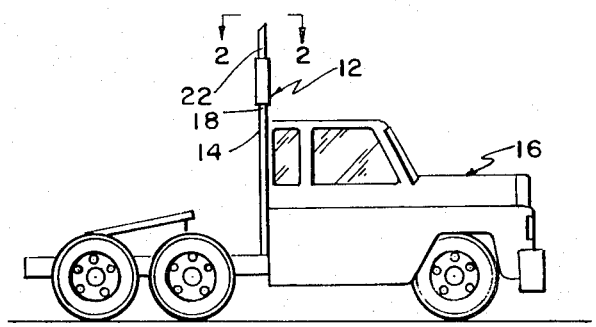
FIG. 1 is a side elvational view of a trailer tractor cab having a tractor muffler structure of this invention connected thereto.
Figure 2:
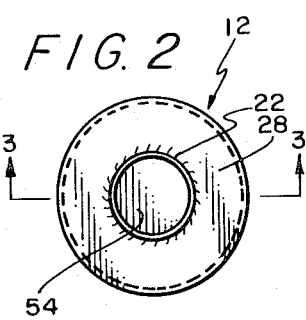
FIG. 2 is an enlarged view taken along line 2—2 in FIG. 1 of only the tractor muffler structure of this invention.

The following is a discussion and description of preferred specific embodiments of the tractor muffler structure of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and in particular to FIG. 1 a tractor muffler structure of this invention, indicated generally at 12, is shown as secured to an exhaust pipe 14 on a tractor trailer cab 16. The tractor muffler structure 12 is shown as mounted in a vertical condition but will function and achieve the results of this invention when horizontal or inclined as will be explained.

The tractor muffler structure 12 includes: (1) an inlet pipe member 18 secured to the exhaust pipe 14; (2) a basic housing assembly 20 connected to the inlet pipe member 18; (3) an outlet pipe member 22 connected to an upper portion of the basic housing assembly 20; and (4) a fluid control assembly 24 mounted within the basic housing assembly 20. The inlet pipe member 18 and the outlet pipe member 22 are substantially identical structures being of tubular construction operable to convey fluids the longitudinal axis thereof.

The basic housing assembly 20 resembles a cylindrical cannister structure having a side wall 26 integral with a top wall 28 and a bottom wall 30. The top wall 28 is provided with a central hole 32 through which the outlet pipe member 22 extends.

The bottom wall 30 is provided with a central hole through which the inlet pipe member 18 extends plus an offset drainage hole 36. The drainage hole 36 allows any liquids, particles, etc. to flow from the interior of the basic housing assembly 20.

Figure 3:
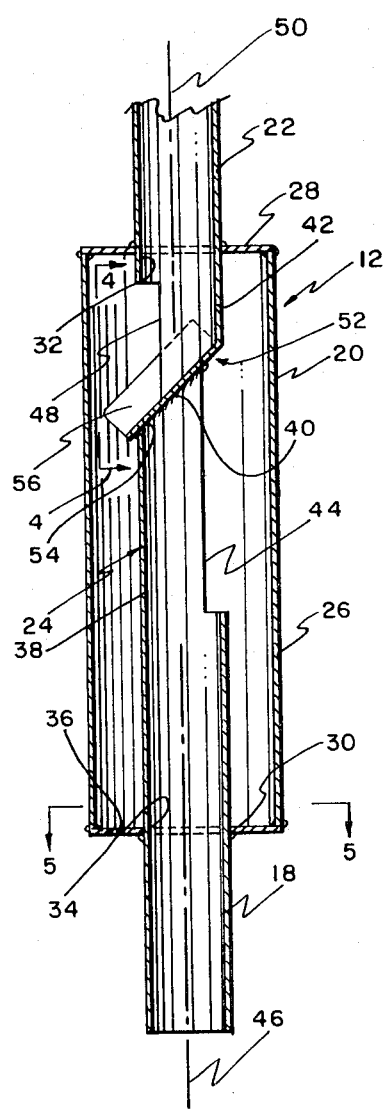
FIG. 3 is a fragmentary sectional view taken along line 3—3 in FIG. 2.
Figure 4:
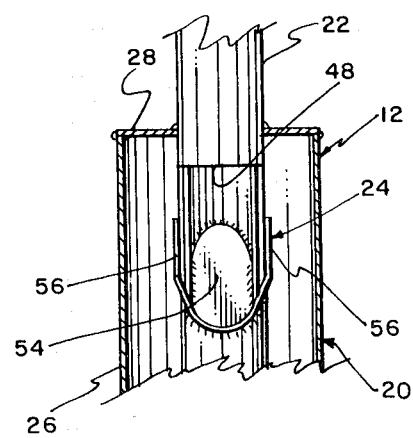
FIG. 4 is a fragmentary view taken along line 4—4 in FIG. 3.
Figure 5:
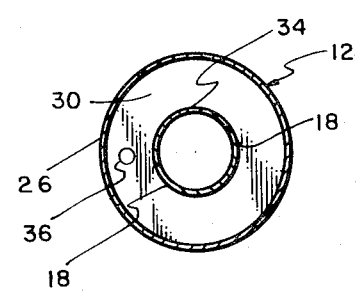
FIG. 5 is a sectional view taken along line 5—5 in FIG. 3.

As best seen in FIGS. 3 and 4, the fluid control assembly 24 includes (1) an inlet control member 38 secured to the inlet pipe member 18; (2) an intermediate control member 40 connected to a upper portion 42 of the inlet control member 38; and (3) an outlet control member 42 connected between the intermediate control member 40 and the outlet pipe member 22.

The inlet control member 38 is of a tubular construction having an upper exhaust inlet opening 44 which directs exhaust gases laterally of a longitudinal axis indicated at 46.

The outlet control member 42 is similar to the inlet control member 38 being of a tubular construction having an exhaust outlet opening 48 which directs exhaust gases inwardly to flow upwardly parallel to a central longitudinal axis indicated at 50. It is noted that the exhaust outlet opening 48 and the exhaust inlet opening 48 both open outwardly in directly opposed directions for reasons to be explained.

The intermediate control member 40 includes a deflector plate assembly 52 having an inclined bottom wall section 54 with integral parallel side wall sections 56. The bottom wall section 54 is secured as by welding to abutting, adjacent portions of the inlet control member 38 and the outlet control member 42.

The side wall sections 56 extend upwardly and acts to control and direct any fluid flowing into the exhaust outlet opening 48 in manner to be explained.

USE AND OPERATION OF THE INVENTION

As noted in FIG. 1 the tractor muffler structure 12 of this invention can be readily attached to the exhaust pipe 14 of the tractor trailer cab 16 by a clamp member, welding, or the like.

During operation when the engine of the tractor trailer cab 16 is running, the exhaust gases are carried upwardly into the exhaust pipe 14 and the inlet pipe member 18. The gases are released into the interior of the basic housing assembly 20 after passing through the inlet control member 38 and the exhaust inlet opening 44.

The exhaust gases then have to rotate 180 degrees in order to exit through the exhaust outlet opening 48 into the outlet control member 42. Obviously, the exhaust gases are then carried to the atomosphere by the outlet pipe member 22.

The intermediate control member 40 has the bottom wall section 54 of the deflector plate assembly 52 extended across the longitudinal axis 46–50 of the inlet control member 38 and the outlet control member 42. This requires the exhaust gases to swirl or rotate the 180 degrees but serves a better purpose to prevent moisture and foreign particles from entering the interior of the engine of the tractor trailer cab 16.

For example, during rain or snowing, the moisture will enter and be directed downwardly through the outlet pipe member 22, the outlet control member 42, and onto the bottom wall section 54 of the intermediate control member 40. The side wall sections 56 act to contain the moisture on the inclined bottom wall section 54 which channels same toward the cylindrical side wall 26 of the basic housing assembly 20.

The moisture is carried downwardly onto the bottom wall 30 where it is conveyed through the drainage hole 36.

It is noted that the tractor muffler structure of this invention acts to keep moisture out of the engine compartment when not being used without the use of flapper caps or other such structures.

The tractor muffler structure of this invention is easy to install, simple and reliable in operation, and economical to produce.

While the invention has been described in conjunction with preferred specific embodiments thereof, it will be understood that this description is intended to illustrate and not to limit the scope of the invention, which is defined by the following claims.

I claim:
1. A muffler structure adapted to be connected about an outlet opening on an exhaust pipe; comprising:
   (a) an inlet pipe member connected to the exhaust pipe;
   (b) a basic housing assembly secured to said inlet pipe member;
   (c) a fluid control assembly mounted within said basic housing assembly and connected to said inlet pipe adapted to receive exhaust fluids therefrom;
   (d) said fluid control assembly having a deflector plate assembly extended across a longitudinal axis and upper end of said inlet pipe member to keep fluids and foreign particles under gravity from flowing therein;
   (e) said fluid control assembly having an inlet control member mounted between and to said inlet pipe member and said deflector plate assembly and an outlet control member mounted between and to said deflector plate assembly and said basic housing assembly;
   (f) said deflector plate assembly extended across aligned longitudinal axis of said inlet control member and said outlet control member to control movement of gases within said basic housing assembly;
   (g) said inlet control member and said outlet control member each having an exhaust opening adjacent said deflector plate assembly to direct fluids around said deflector plate assembly for subsequent movement; and
   (h) said exhaust openings in said inlet control member and said outlet control member open in opposed directions for maximum efficiency.

2. A muffler structure as described in claim 1, wherein:
   (a) said exhaust opening in said inlet control member positioned below said deflector plate assembly; and
   (b) said exhaust opening in said outlet control member positioned above said deflector plate assembly.

3. A muffler structure adapted to be connected about an outlet opening on an exhaust pipe; comprising:
   (a) an inlet pipe member connected to the exhaust pipe;
   (b) a basic housing assembly secured to said inlet pipe member;
   (c) a fluid control assembly mounted within said basic housing assembly and connected to said inlet pipe adapted to receive exhaust fluids therefrom;
   (d) said fluid control assembly having a deflector plate assembly extended across a longitudinal axis and upper end of said inlet pipe member to keep fluids and foreign particles under gravity from flowing therein;
   (e) said fluid control assembly having an inlet control member mounted between and to said inlet pipe member and said deflector plate assembly and an outlet control member mounted between and to said deflector plate assembly and said basic housing assembly;
   (f) said deflector plate assembly extended across aligned longitudinal axis of said inlet control member and said outlet control member to control movement of gases within said basic housing assembly;
   (g) said inlet control member and said outlet control member each having an exhaust opening adjacent said deflector plate assembly to direct fluids around said deflector plate assembly for subsequent movement;

(h) said exhaust openings in said inlet control member and said outlet control member open in opposed directions for maximum efficiency;

(i) said deflector plate assembly havng a bottom wall section secured across aligned adjacent openings of said inlet control member and said outlet control member to direct fluid laterally and outwardly of aligned longitudinal axis thereof;

(j) said deflector plate assembly having side wall sections secured to opposite sides of said bottom wall section to direct fluids laterally of said inlet control member toward a side wall of said basic housing assembly; and (k) said side wall sections and said bottom wall section form a continuous seal between said inlet control member and said outlet control section.

4. A muffler structure adapted to be connected about an outlet opening on an exhaust pipe; comprising:

(a) an inlet pipe member connected to the exhaust pipe;

(b) a basic housing assembly secured to said inlet pipe member;

(c) an outlet pipe member secured to said basic housing assembly;

(d) a fluid control assembly mounted within said basic housing assembly and connected to said inlet pipe member and said outlet pipe member;

(e) said fluid control assembly includes an inlet control member connected to said inlet pipe member; an outlet control member connected to said outlet pipe member, and a deflector plate assembly connected therebetween;

(f) said deflector plate assembly includes an inclined bottom wall section secured to adjacent opposed portions of said inlet control member and said outlet control member; and (g) said inlet control member and said outlet control member each having an exhaust opening adjacent said bottom wall section directed in opposite directions;

whereby fluids and foreign particles are directed in an opposite direction from said exhaust opening in said inlet control member to keep same from entering said inlet pipe member.

5. A muffler structure as described in claim 4, wherein:

(a) said deflector plate assembly having side wall sections secured to opposite sides of side bottom wall section to direct fluids laterally out said exhaust opening in said outlet control member.

6. A muffler structure as described in claim 5, wherein:

(a) said side wall sections and said bottom wall section form a continuous seal between said inlet control member and outlet control section.

7. A muffler structure as described in claim 4, wherein:

(a) said basic housing assembly having a drainage hole at a lower portion thereof to allow escape of fluids therefrom.

* * * * *